US006855765B2

(12) United States Patent
Chew et al.

(10) Patent No.: US 6,855,765 B2
(45) Date of Patent: Feb. 15, 2005

(54) HEAT AND HOT WATER RESISTANT POLYURETHANE SEALANT

(75) Inventors: Yit Lin Chew, Singapore (SG); Suat Hong Goh, Singapore (SG); Xu Zhou, Singapore (SG)

(73) Assignee: National University of Singapore, Singapore (SG)

( * ) Notice: Subject to any disclaimer, the term of this patent is extended or adjusted under 35 U.S.C. 154(b) by 70 days.

(21) Appl. No.: 10/012,533

(22) Filed: Dec. 12, 2001

(65) Prior Publication Data

US 2003/0149167 A1 Aug. 7, 2003

(51) Int. Cl.$^7$ .................... C08K 5/3435; C08K 5/3432; C08G 18/48; C08G 18/32; C08G 18/79
(52) U.S. Cl. .................. 524/720; 524/102; 524/188; 524/267; 524/436; 524/714; 524/730; 524/731; 524/779; 525/453; 528/28; 528/76; 528/77
(58) Field of Search ................................ 524/102, 188, 524/267, 436, 714, 720, 730, 731, 779; 525/453; 528/28, 76, 77

(56) References Cited

U.S. PATENT DOCUMENTS

| 4,267,044 A | * | 5/1981 | Kroplinski et al. .... 210/321.77 |
| 4,624,996 A | * | 11/1986 | Rizk et al. ................... 525/453 |
| 4,870,150 A | * | 9/1989 | Bandlish et al. .............. 528/45 |
| 5,688,860 A | * | 11/1997 | Croft .......................... 524/710 |
| 5,981,683 A | * | 11/1999 | Gillis et al. .................... 528/44 |
| 6,455,598 B1 | * | 9/2002 | Gerace et al. ................ 521/41 |
| 6,583,195 B2 | * | 6/2003 | Sokol ............................ 522/7 |

* cited by examiner

*Primary Examiner*—Rabon Sergent
(74) *Attorney, Agent, or Firm*—Birch, Stewart Kolasch & Birch LLP

(57) ABSTRACT

A two-component polyurethane sealant composition is described. The polyurethane sealant of the invention exhibits improved resistance to degradation by heat and hot water. The composition of the invention includes a novel hindered amine antioxidant.

20 Claims, No Drawings

HEAT AND HOT WATER RESISTANT POLYURETHANE SEALANT

FIELD OF THE INVENTION

The present invention relates to sealants/adhesives. The sealant/adhesive of the invention is formulated to exhibit high resistance to heat and hot water immersion.

BACKGROUND OF THE INVENTION

Sealants are widely used in building and civil engineering works as they serve several general functions as follows:
(a) Waterproofing Function
Sealants are used as components of complete waterproofing system by resisting the passage of water into joined part of the building.
(b) Environmental Function
Sealants are used as barriers to resist the passage of heat, light, sound, odor, dust, etc. into the building.
(c) Movement Control Function
Sealants are used to accommodate continuing changes in size of the joint due to thermal, moisture and structural movements, including vibration and creep.

A sealant must be able to perform these functions. At the same time, it must have acceptable appearance, durability, economic and maintenance cost. In some cases, additional functions may be required such as ability to perform under special temperature or humidity conditions and/or to withstand a polluted atmosphere.

Polyurethane as a high performance sealant is widely used in joints of curtain walling on building facades. Although highly polymeric, it is susceptible to degradation due to environmental factors such as heat, moisture, UV and others. These factors either alone or in combination affect the performance of the material in the process of curing as well as during long term exposures. In the tropics, the material also tends to fail prematurely if exposed excessively to heat and water. High temperature for example may change the physical structure of polyurethane by loosening inter-macromolecular interactions and change the chemical structure of polyurethane through the break-up of macromolecular chains and the formation of low molecular mass products. The polyurethane sealant degradation at high temperature in the presence of moisture or water may proceed through water-swelling, loss of inter-macromolecular interactions, hydrolysis of urethane linkage and chain degradation.

SUMMARY OF THE INVENTION

It is one aspect of the invention to provide a new polyurethane sealant that exhibits high resistance to heat and hot water immersion. The product has commercial application in areas requiring sealant with high resistance to heat and hot water immersion e.g. a building facade.

It is another aspect of the invention to provide a polyurethane sealant that resists oxidative damage. In the present invention this is accomplished by incorporation of a novel antioxidant compound.

It is a further aspect of the invention to provide a method for sealing a surface (as a coating) or sealing and adhering a joint between two surfaces by applying the polyurethane composition of the present invention to such a surface or joint.

The present invention is embodied by a novel two-component polyurethane sealant. The advantages of this new two-component polyurethane sealant reside principally in preventing water-swelling, water-absorption and hydrolysis, increasing thermal stability of a seal and enhancing adhesion to a porous material, for example concrete, in hot water or under conditions of a warm, humid atmosphere.

DETAILED DESCRIPTION OF THE INVENTION

The present invention is embodied partly in a two-component polyurethane sealant. The first component (A) comprises a hydrophobic polyether diol, a cross-linker, and an antioxidant. Component A can further comprise a filler, a plasticizer, a drying agent, a silane adduct as adhesion promoter, an anti-bubble agent, a thixotrope and a curing catalyst as found necessary to particular applications.

The second component (B) comprises a polyisocyanate as a curing agent. An example of such a modified isocyanate is Isonate 143L from Dow Chemical Co.

The two-component polyurethane sealant of the invention retains its favorable properties as a sealant or adhesive despite prolonged exposure to an atmosphere of hot (e.g. 70° C. or warmer), humid air or to prolonged immersion in hot (e.g. (70° C.) water.

The hydrophobic polyether diol used in Component A is preferably polybutylene glycol (PBG) with a number average molecular weight of 2000~4000, polytetramethylene oxide glycol (PTMO) with a number average molecular weight of 2000~4000 or a mixture of PBG and PTMO. The polybutylene glycol (PBG) with a number average molecular weight of 2000~4000 is preferred. Because of high hydrophobicity of PBG, the cured sealant containing PBG has the merit of efficiently resisting water-absorption and water-swelling during prolonged immersion in hot water, especially as compared with a conventional sealant containing polypropylene glycol diol (PPG). Such resistance against water-absorption and water-swelling of the polyurethane sealant helps to maintain elastic recovery, tensile strength and adhesion to concrete in hot, humid air and during immersion hot-water. PTMO helps to enhance heat resistance.

The cross-linker used in Component A is preferably polypropylene glycol triol (number average molecular weight: ~3000) or N,N,N',N'-tetrakis(2-hydroxypropyl) ethylenediamine or a mixture of these two compounds. A mixture of the polypropylene glycol triol with a small proportion, preferably from 20 to 60 wt % of the amount of the triol, of N,N,N',N'-tetrakis(2-hydroxypropyl) ethylenediamine provides increased elastic recovery upon heat exposure.

The anti-oxidant used in Component A is a sterically hindered amine of the formula (I):

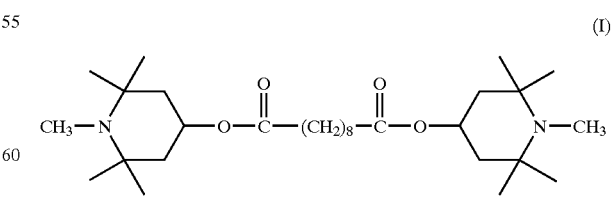

(I)

Without being bound by any theory of the invention, it appears that the following mechanism provides the resistance to oxidation of the sealant that is observed in the present invention:

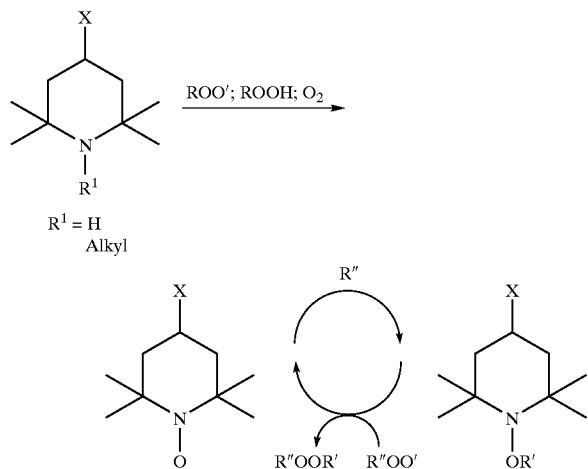

The anti-oxidant used in Component A is a sterically hindered amine of Formula (I). The above-described anti-oxidation mechanism shows that the anti-oxidant used in this formulation can consume both alkyl radicals (•R) and peroxy radicals (•OOR), and that the active nitroxy radicals are reformed and thus not readily consumed during the protracted anti-oxidation process. These two features can contribute to the persistent anti-oxidation function during prolonged immersion in hot water. Performance testing as described below shows that the cured sealant containing this sterically hindered amine remained undiscoloured after prolonged immersion in hot water while the sealant containing a conventional phenolic anti-oxidant yellowed markedly. The antioxidant is typically added in an amount of 0.3 to 2 wt % of component A.

The silane adduct as adhesion promoter used in Component A is preferably the reaction product of gamma-aminopropyltriethoxysilane (APS) with 2-cyanoethyl acrylate (CEA), or the reaction product of APS with benzyl methacrylate (BMA), or the mixture of these two reaction products. The reaction mole ratio of acrylate to gamma-aminopropyltriethoxysilane is preferably in the range of 2:1 to 1:1, preferably about 1.4:1.

The silane adduct is added to enhance the adhesion of the sealant to the substrate, e.g., concrete, when immersed in hot water. The first merit of the silane adduct is that in this amino-functional adhesion promoter the active primary amino groups of APS are converted to secondary and even partially to tertiary amino groups by the adduct reaction with CEA or BMA. This decreases their ability to react with isocyanate during curing. Thus the silane adduct is not completely dissolved into the sealant matrix nor does it disturb the curing reaction between the isocyanate and the polyol. The second merit is that the cyano group of CEA, a very polar group, helps to increase the compatibility of the silane layers. The silane layers are formed on a substrate (e.g. concrete) during curing after application of the sealant, with the polar polyurethane sealant. The phenyl group of BMA helps to increase thermal stability of the silane adduct layer. One purpose of the silane adduct is to establish strong linkage between the polyurethane sealant and the silane adduct, but, meanwhile, to avoid total dissolution of the adduct in the cured sealant without forming adhesion promotion layers between the sealant and the substrate.

The fillers for component A can be any known in the art, but preferably calcium carbonate is used.

The thixotrope can be any known in the art, but preferably fumed silica, especially a hydrophobic fumed silica, is used.

The curing catalyst can be any known in the art, but preferably dibutylin dilaurate (DBTDL), Tin (II) 2-ethylhexanoate (SnOct) or triethylene diamine (DABCO) or a mixture thereof, is used.

The plasticizer can also be any known in the art, but preferably a hydrocarbon resin or a phthalate or a mixture thereof is used. A more preferable plasticizer is dioctyl phthalate (DOP).

The drying agent used in Component A can be any known in the art, but preferably a chalcogen oxide such as calcium oxide is used. The drying agent has three functions in the polyurethane sealant of the invention. First, it helps to prevent bubbling during the curing process by reacting with carbon dioxide that may be produced during curing. Second, it consumes the water molecules that diffuse near the polyurethane chains in the cured sealant when the sealant is immersed in hot water so as to deter water-swelling of the sealant. Third, when calcium oxide is utilized, during hot-water immersion calcium oxide can react with water to form calcium carbonate which has a high modulus. Thus, the loss of strength by hot-water immersion can be counteracted to some extent by the formation of such calcium carbonate during the immersion.

The anti-bubble agent used in Component A can be any known in the art, but is preferably a silane adduct, most preferably poly(dimethylsiloxane) with a number average molecular weight of 30000~50000. Prevention of bubble formation helps to raise resistance of sealant against water, especially hot water.

The polyisocyanate as curing agent used in Component B is preferably a modified methylene-bis-(4-phenyl isocyanate) (MDI) that contains a minority of carbodiimide groups (—N=C=N—). The polyisocyanate will preferably have from 25 to 35 mol %, preferably have a residual of from 27 to 30 mol %, most preferably from 28.2 to 29.2 mol %, of NCO groups. Component B comprises a polyisocyanate as curing agent. The NCO/OH ratio in the polyisocyanate is preferably in the range 1/1 to 1.5/1, more preferably from 1.2/1 to 1.3/1. An acceptable polyisocyanate is Isonate 143L MDI provided by Dow Chemical.

The carbodiimide groups have two functions. First, they consume water molecules that diffuse to the polyurethane chains of the immersed sealant so as to prevent water swelling. Second, the —N=C=N— groups are gradually converted by hot water to —NH—CO—NH— group which can form very strong interpolymer hydrogen bonding in the sealant so as to counteract the gradual loss of strength of the sealant caused by immersion in hot water.

The preferred amounts of the various materials are:
For component A (as a proportion of component A):
  polyether—20 to 60 wt %
  cross-linker—0.5 to 8 wt %
  antioxidant—0.3 to 1.0 wt %
  drying agent—1.0 to 5.0 wt.%
  anti-bubble agent—0.3 to 0.8 wt %
  adhesion promoter—0.5 to 2.0 wt %
  plasticizer—5.0 to 15 wt %
  filler—20 to 60 wt %
  thixotrope—1.0 to 5.0 wt %
  catalyst—0.02 to 0.8 wt %
  solvent—0.6 to 2 wt %
For component B (as a proportion of component B):
  Curing agent—8.0 to 20 wt %
Component A contains OH functionalities while Component B contains NCO functionalities. The NCO/OH molar ratio is preferably kept in the range of about 1.2 to 1.3.

A solvent or carrier can be added at up to 80 to 92 wt % of the total composition A combination of the polyether, cross-linker, antioxidant, drying agent, anti-bubble agent, adhesion promoter and curing agent provides the highest performance of the sealing composition in terms of best resistance to exposure to a hot, humid atmosphere or immersion in hot water.

Other materials can be added to the composition of the present invention to obtain additional desired properties. For example, the sealant can be colored by the addition of a pigment.

The polyurethane sealant of the present invention is made and utilized by methods typical in the art.

WORKING EXAMPLES AND COMPARATIVE TESTS

The present invention is illustrated by the following Examples, which are not to be considered limitative of the invention. In these Examples, the invention is also compared against formulations of the prior art.

Example 1

Formulations Tested

A low modulus self-levelling PU sealant for the horizontal joints with frequent and large movement (MZ) was formulated as follows:

| Component A: | |
| --- | --- |
| PBG 2000 | 40 g |
| PPG triol 3000 | 5 g |
| DOP | 10 g |
| $CaCO_3$ | 25 g |
| CaO | 3 g |
| Fumed silica | 1 g |
| Silane adduct | 0.5 g |
| Antioxidant admixture | 1 g |
| DBTDL | 0.08 g |
| Component B: | |
| Isonate 143L | 8.8 g |

PBG 2000 is poly(1,2-butylene glycol) having a number average molecular weight of 2000. PPG triol 3000 is polypropylene oxide triol having a number average molecular weight of 3000. Isonate 143L is a product of Dow Chemical. The silane adduct is a product of reaction of aminopropylsilane with a cyano-containing acrylate.

1. Selection of Commercial PU Sealants for Comparison

Due to current absence of the commercial sealants designated as hot-water immersible or water & heat resistant, some existing commercial high-performance water resistant or water immersible PU sealants commonly used in the tropics and on highways, bridges and airports were selected for comparison with this self-developed sealant.

A water-resistant one-component PU sealant (Bostic B2637, designated as C1), a water-immersible two-component PU sealant (Bostic B2640, designated as C2), a trafficable two-component PU sealant (Bostic B2656, designated as C3) all from a well-known sealant manufacturer were selected for this study to compare with the PU sealant of the invention (MZ). All of C1, C2 and C3 have been widely used on various construction sites including airports in the tropical countries like Malaysia, Indonesia, Australia, New Zealand and Singapore.

The three PU sealants can be regarded as representing the class of present commercially available sealants that have the highest resistance against combined water and heat.

2. Curing of Sealants

Specimens of a multi-component sealant were cured for 14 days at standard conditions (23±2° C. and 50±5% relative humidity). Specimens of a single-component were cured for 21 days as follows: 7 days at standard conditions; 7 days at 38±2° C. and 95±5% relative humidity; and 7 days at standard conditions.

3. Water & Heat Weathering

Among various patterns of combined water and heat, immersion in heated water should be the most extreme condition for construction sealants. As mentioned above, the maximum temperature of the building structures in the tropics can reach 70° C. Thus in this study, combined water & heat weathering test was implemented by immersing cured sealant specimens in 70° C. water for a period from 7 to 35 days before cohesion tests were performed.

4. Cohesion

There are numerous properties related to cohesion and cohesive failure. Therefore, it is difficult and unnecessary to test all the properties to evaluate cohesion strength and predict possibility of cohesive failure. The more efficient way is to select the most distinctive properties that do not largely overlap with each other. In this study, the testing system designed to evaluate sealant cohesion included water-swelling rate, tensile strength, hardness and elastic recovery representing the influence of hot water on a sealant in shape, internal strength, surface cohesion and movement capability, respectively, the total performance in which aspects are believed to determine the cohesion strength of the affected sealant. The experimental details with individual properties are elaborated as follows.

4.1. Water Swelling Rate

Two completely cured rectangular specimens with a length of 115 mm, a width of 30 mm and a depth of 3 mm were immersed in 70° C. water for 7 days and 28 days, respectively, then taken from the water and kept in air at room temperature for ten minutes. Then the lengths of the immersed specimens, 1x, were obtained. The water-swelling rate was calculated by the following equation.

$$\text{Water-swelling rate } \% = [(1x-115)/115] \times 100$$

4.2. Tensile Strength

After the curing period three dumbbell specimens were prepared using a die giving a between-bench-mark distance of 25.0 mm, a testing width of 8.0 mm, and a thickness of 3.0 mm. Then two of the dumbbell specimens were immersed in 70° C. water for 7 and 28 days, respectively. Thirty minutes after removal from the immersion the two specimens were mounted on grips of the Instron machine and extended at the separation rate of 500±50 mm/min. The values of 25% tensile stress were taken as a representation of the tensile strength. The control (not immersed) specimen was measured in the same manner and comparison was made with the immersed specimens.

4.3. Hardness

Three rectangular specimens with dimensions of 130 by 40 by 6 mm were prepared after curing. Then two of them were immersed in 70° C. water for 7 and 28 days, respectively. 30 minutes after removal from the immersion each specimen was measured with a Shore-A hardness tester with six readings. The mean value of the six readings is reported as the hardness value. The control (not immersed) specimen was measured in the same manner and comparison was made with the immersed specimens.

4.4. Elastic Recovery

Three specimens were cured in aluminium channels with dimensions of 300 mm long, 10 mm wide and 15 mm deep.

Two of them were immersed in 70° C. water for 35 days. 30 minutes after removal from the immersion each specimen was measured with a self-designed non-destructive elastic recovery tester. The result was expressed in a percentage representing the degree of recovery within 20 seconds after the surface of the specimen is pressed by the detector ball of the tester to a depth of 5 mm in 10 seconds, held in compression at the depth for 5 second and then relieved of compression force. The control specimen was measured in the same manner and comparison was made with the immersed specimens.

5. Peel-Adhesion 5.1. Hand-pull

Three specimens with dimensions of 60 by 15 by 3 mm were applied and cured on concrete blocks. Two of them were immersed in 70° C. water for 28 days. Two hours after removal from the immersion each specimen was completely pulled from the substrate by hand. The areas of cohesive and adhesive failure were measured and recorded. The average of the two readings was taken as the final data. The control (not immersed) specimen was measured in the same manner and comparison was made with the immersed specimens.

5.2. Machine-pull

Three specimens with dimensions of 60 by 15 by 3 mm, which contained a layer of aluminum cloth with the same width, were applied and cured on concrete blocks. Two of them were immersed in 70° C. water for 28 days. Two hours after removal from the immersion each specimen was gripped at the ends of the aluminum cloth and completely pulled off the substrate by an Instron machine. The maximum tensile stress was recorded and the average of the two readings was taken as the final result. The control (not immersed) specimen was measured in the same manner and comparison was made with the immersed specimens.

6. Movement Capability

ASTM C719 test comprises 7 days of immersion in 25° C. water, 7 days of being cramped at 70° C., and ten cycles of extension and contraction. It involves a combination of water, heat and cyclic movement. This cyclic movement test modified C719 by repeating the three-section cycle until the sealant failed. It is supposed that the more cycles the sealant can sustain, the higher its resistance against combined water, heat and cyclic movement. This modified C719 is employed to verify sealant movement capability when protractedly exposed to combined water and heat.

For adhesive loss of each specimen, the average of loss areas of the two sides shall be taken as the loss area. The total adhesive loss areas of the three specimens tested for the concrete substrate shall be no more than 9 cm$^2$. For cohesive loss of each specimen, the maximum failure depth shall be taken as the cohesive loss depth. The total loss depth of the three specimens shall be no more than 1.8 cm. Because the environmental factors like heat, water and cyclic movement are all embodied, this test can be regarded as a test package that a hot-water resistant sealant should pass. Based upon previous research and in order to raise the threshold that a hot water resistant sealant is required to pass, a passing sealant shall exhibit a compression elastic recovery of no less than 70%. The criteria for perfect performance in adhesion, cohesion and elastic recovery are set to be adhesive failure less than 0.2 cm$^2$, cohesive failure less than 0.1 cm and recovery value larger than 90%.

Results and Discussion

1. Cohesion

Water Swelling—A Cause for Sealant Deformation

Sealants might swell when immersed in water due to water absorption, hydrolysis, plasticization and/or loss of physical cross-linking. The swelling rate would be expected to increase with both temperature and time. Water swelling followed by subsequent uneven drying and re-swelling would induce serious deformation of the on-site sealants, a type of cohesive failure frequently observed on building joints in the tropics.

TABLE 1

Water Swelling Rates of PU Sealants after Immersion in 70° C. water

| Specimen | C1 | C2 | C3 | MZ |
|---|---|---|---|---|
| 7-days | 7.6% | 3.5% | 5.2% | 0.4% |
| 28-days | 9.3% | 5.2% | 8.0% | 3.8% |

As shown in Table 1, the commercial sealants, C1, C2 and C3, swelled markedly at rates of 7.6%, 3.5% and 5.2%, respectively, after merely 7 days immersion in 70° C. water whereas no appreciable swelling was observed for MZ. When the immersion was extended to 28 days, MZ still showed a much lower swelling rate than all the commercial sealants.

Tensile Stress A Measure of Internal Strength

Sealants may soften and dampen on various construction sites after protracted exposure to severe weathering conditions. Due to loss of internal strength, this type of cohesive failure can be evaluated by measurement of tensile stress.

TABLE 2

25% Tensile Stress Values of PU Sealants (mPa) after Immersion in 70° C. water

| Specimen | C1 | C2 | C3 | MZ |
|---|---|---|---|---|
| Control | 0.10 | 0.12 | 0.09 | 0.08 |
| 28-days | molten | 0.04 | 0.03 | 0.09 |
| Loss | −100% | −67% | −67% | +13% |

As shown in Table 2, C1, C2 and C3, lost 100%, 67% and 67% of their 25% tensile stress, respectively, after 28 days of immersion in 70° C. water whereas MZ exhibited a slight, though not significant, increase of tensile stress.

Hardness—A Measure of Resistance to Penetration

Hardness is a measure of resistance to penetration and it is also used as a quick check of the state of the effects of time and aging on the sealant structure. Retention of hardness is fairly important for trafficable construction sites like highways, bridges and airports.

TABLE 3

Shore-A Hardness Values of PU Sealants after Immersion in 70° C. water

| Specimen | C1 | C2 | C3 | MZ |
|---|---|---|---|---|
| Control | 23.0 | 25.8 | 25.0 | 16.0 |
| 28-days | ~0 | 13.8 | 5.0 | 17.2 |
| Change (unit) | −23.0 | −12.0 | −20.0 | +1.2 |

As shown in Table 3, shore-A hardness values of all the commercial sealants decreased dramatically after 28 days of immersion in 70° C. water, and on the contrary, hardness of MZ remained the almost same after the immersion.

Elastic Recovery—Movement Capability

Recovery is the only measure of flow characteristics called for in any standard specification. Good recovery after removal from any imposed load means little stress relaxation, creep and compression set undergone by the affected sealant. Thus retention of elastic recovery of a sealant against external weathering is well proportional to its practical on-site movement capability.

TABLE 4

Elastic Recovery Values of PU Sealants after Immersion in 70° C. water

| Specimen | C1 | C2 | C3 | MZ |
|---|---|---|---|---|
| Control | 95% | 100% | 98% | 98% |
| 35-days | Molten | 85% | 66% | 100% |
| Loss | −100% | −15% | −32% | +2% |

As shown in Table 4, loss percentages of elastic recovery values varied from 15% to nearly 100% for the three commercial sealants after 35 days of immersion in 70° C. water. Amazingly, the elastic recovery of MZ was recorded at 100% even after the same immersion period and a slight increase of 2% was observed.

2. Peel-adhesion

All the commercial PU sealants are required to be applied with primers, thus bringing inconvenience in on-site operation. MZ was intended to be used either with a primer or without it.

TABLE 5

Data Analysis of Peel Force (Machine-Pull Method) and Cohesive Failure (Hand-Pull Method)

| CONDITION | SEALANT | SUBSTRATE | PEEL FORCE (N/cm) | COHESIVE FAILURE (%) |
|---|---|---|---|---|
| Control | C1 | Mortar (P) | 39.8 | 99 |
|  | C2 | Mortar (P) | 21.8 | 55 |
|  | MZ | Mortar (P) | 47.5 | 100 |
|  |  | Mortar (uP) | 23.5 | 60 |
| Hot-Water | C1 | Mortar (P) | 4.6 | 0 |
|  | C2 | Mortar (P) | 24.7 | 68 |
|  | MZ | Mortar (P) | 33.3 | 83 |
|  |  | Mortar (uP) | 32.5 | 80 |

As shown above, the adhesion of MZ with a primer after curing is superior in terms of both peel-force and failure mode as compared with C1 and C2, while the adhesion of MZ without a primer after curing is still acceptable as its adhesion to concrete is slightly higher than that of C2.

After 28 days of immersion in 70° C. water, C1 lost almost all of its adhesion to concrete whereas C2 slightly increased its adhesion to concrete, indicating good resistance against combined water and heat in terms of peel-adhesion with a primer used.

Adhesion of MZ with primer fell moderately after immersion in 70° C. water for 28 days, but still remained at a high level as compared with C2 either before or after the immersion, showing MZ with a primer is capable of performing well in hot water in terms of peel adhesion. Unexpectedly, the adhesion of MZ without a primer rose sharply after 28 days' immersion in 70° C. water, even reaching the level of MZ with a primer after the immersion, indicting MZ can be applied without a primer even when high resistance against combined water and heat is demanded.

3. Movement Capability

Repeated ASTM tests were conducted to evaluate sealant movement capability under combined water and heat. In the immersion period, water was absorbed by the sealant and when subsequently exposed to heat the sealant was actually subject to damage by the absorbed water accelerated by the heat.

Test results of MZ and the two commercial water-immersible products, C1 and C2, are given in the tables below. A primer is required along with either of the commercial sealants. However, MZ was tested both with a primer and without a primer.

C1 with Primer

TABLE 6

Results of Repeated ASTM C719 on C1 with Primer

| Cycle No. | Total adhesive loss (cm$^2$) | Total cohesive loss (cm) | Average elastic recovery (%) | Comments |
|---|---|---|---|---|
| Before test | Nil | Nil | 90.4 |  |
| Cycle 1 | Nil | 0.50 | 65.3 | Elastic recovery failed. |
| Cycle 2 | Nil | 0.80 | 48.8 | Elastic recovery degraded further. |
| Cycle 3 | Nil | 1.10 | 41.6 | Elastic recovery dropped further |
| Cycle 4 | Nil | 2.25 | 38.9 | Both elastic recovery and cohesion failed. |

Elastic recovery of C1 failed after the first cycle and cohesion failed after the forth cycle.

C2 with Primer

TABLE 7

Results of Repeated ASTM C719 on C2 with Primer

| Cycle No. | Total adhesive loss (cm$^2$) | Total cohesive loss (cm) | Average elastic recovery (%) | Comments |
|---|---|---|---|---|
| Before test | Nil | Nil | 97.1 |  |
| Cycle 1 | Nil | Nil | 92.5 | Perfect |
| Cycle 2 | 1.3 | Nil | 96.4 | Not fail |
| Cycle 3 | 3.1 | Nil | 93.2 | Not fail |
| Cycle 4 | 3.9 | Nil | 95.4 | Not fail |
| Cycle 5 | 6.7 | Nil | 89.7 | Not fail |
| Cycle 6 | 11.3 | Nil | 89.3 | Adhesion failed |

C2 did not show perfect overall performance after the first cycle and showed obvious degradation in adhesion form the second cycle. Adhesion failed after the sixth cycle.

MZ without Primer

TABLE 8

Results of Repeated ASTM C719 on MZ without Primer

| Cycle No. | Total adhesive loss (cm$^2$) | Total cohesive loss (cm) | Average elastic recovery (%) | Comments |
|---|---|---|---|---|
| Before test | Nil | Nil | 100.0 |  |
| Cycle 1 | Nil | Nil | 92.0 | Perfect |
| Cycle 2 | 0.1 | Nil | 98.8 | Perfect |

TABLE 8-continued

Results of Repeated ASTM C719 on MZ without Primer

| Cycle No. | Total adhesive loss (cm²) | Total cohesive loss (cm) | Average elastic recovery (%) | Comments |
|---|---|---|---|---|
| Cycle 3 | 2.3 | Nil | 97.5 | Not fail |
| Cycle 4 | 2.4 | Nil | 98.4 | Not fail |
| Cycle 5 | 3.8 | Nil | 99.7 | Not fail |
| Cycle 6 | 5.8 | Nil | 99.9 | Not fail |
| Cycle 7 | 9.9 | Nil | 99.9 | Adhesion failed |

As shown above, MZ applied to concrete substrate without a primer can sustain at least six periodic cycles of modified ASTM C719 test, and in the first two cycles even exhibits perfect maintenance in adhesion, cohesion and elastic recovery. Such performance is actually moderately better than the performance of C2 with a primer, and much superior to performance of C1 with a primer, especially in cohesion and elastic recovery, suggesting that this sealant without a primer applied has the potential of being durable in an practical environment involving water, heat and cyclic movement.

MZ with Primer

TABLE 9

Results of Repeated ASTM C719 on MZ with Primer

| Cycle No. | Total adhesive loss (cm²) | Total cohesive loss (cm) | Average elastic recovery (%) | Comments |
|---|---|---|---|---|
| Before test | Nil | Nil | 93.1 | |
| Cycle 1 | Nil | Nil | 98.8 | Perfect |
| Cycle 2 | Nil | Nil | 99.9 | Perfect |
| Cycle 3 | Nil | Nil | 99.9 | Perfect |
| Cycle 4 | 0.19 | Nil | 99.9 | Perfect |
| Cycle 5 | 0.23 | Nil | 99.9 | Perfect |

MZ with a primer exhibited perfect overall performance even after the fifth cycle. Apparently, MZ is much superior to C2, a commercial water-immersible PU sealant, in terms of movement capability in combined water (absorbed) and heat.

CONCLUSIONS

Degradation owing to prolonged combination of water and heat has been shown to be much of an element for durability of typical commercial sealants used for airport pavement joints in the tropics. The PU sealant of the invention resists a prolonged combination of water and heat, a problem frequently encountered in airport pavement joints in the tropics. Results from all the tests clearly show that the PU sealant of the invention is superior in at least the following aspects as compared with existing commercial water-resistant or immersible PU sealants.

1) Low water swelling rate and high retention of tensile strength, hardness and elastic recovery in prolonged combination of water and heat.

2) Significant increase of adhesion to unprimered concrete when protractedly exposed to combined water and heat.

3) Superior performance in continuous cyclic movement in an environment of combined water and heat.

Example 2

The superiority of a polyurethane (PU) sealant composition comprising the antioxidant according to the present invention is shown by performance testing in a hot water test. Briefly, the sealant compositions are made in an identical fashion, as described below, except that three different anti-oxidants are used. The different anti-oxidants (a phenolic, a phenolic plus thiosynergist, and the antioxidant of the invention) were added at 1.4 wt % of component A. Then the three sealants are cured at 25° C. for three weeks and then cut into samples with the dimension of 115 by 20 by 3 mm. The samples are kept in 70° C. water for 7 and 28 days, respectively and then assessed for discoloration. (The original color is white.)

Sealant Compositions, Except Antioxidant:

| Component A: | |
|---|---|
| PBG 2000 | 40 g |
| PPG triol 2000 | 5 g |
| DOP | 10 g |
| $CaCO_3$ | 25 g |
| CaO | 3 g |
| Fumed silica | 1 g |
| Silane adduct | 0.5 g |
| DBTDL | 0.08 g |
| Component B: | |
| Isonate 143L | 8.8 g |

Results

The sterically hindered amine in the formulation of the invention is of Formula (I). The results are shown in the table below.

Discoloration of the Three Sealants Containing Different Anti-oxidants after Prolonged Immersion in 70° C. Water

| Immersion Period | 7-Days | 28-Days |
|---|---|---|
| PU Sealant Containing a Phenolic (prior art) | Pale yellow | Yellow |
| PU Sealant Containing a Phenolic and a Thiosynergist (prior art) | No appreciable change in color | Yellowish |
| PU Sealant Containing a Sterically Hindered Amine (invention) | No appreciable change in color | Slightly pale yellow |

The invention being thus described, it will be apparent to one of ordinary skill in the art that various modifications of the ingredients of the invention, or methods of its formulation or use, can be made. Such modifications are considered to be encompassed by the invention, which is defined by the claims below.

What is claimed is:

1. A polyurethane sealant composition comprising a component A and a component B, wherein component A comprises a hydrophobic polyether diol selected from the group consisting of polybutylene glycol, polytetramethylene ether glycol and a mixture thereof, a cross-linker and an antioxidant of the formula I:

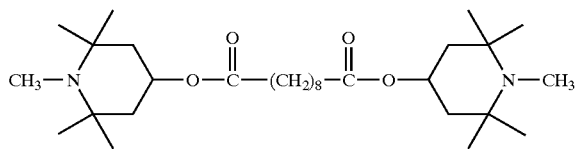

and component B comprises a polyisocyanate curing agent.

2. The polyurethane sealant composition of claim 1, wherein the polyether diol is polybutylene glycol having a number average molecular weight of 2000 to 4000 daltons.

3. The polyurethane sealant composition of claim 1, wherein the polybutylene glycol is poly(1,2 butylene glycol).

4. The polyurethane sealant composition of claim 1, wherein the polyether diol is polybutylene glycol having a number average molecular weight of 2000 to 4000 daltons or a mixture of polybutylene glycol having a number average molecular weight of 2000 to 4000 daltons and polytetramethylene oxide glycol having a number average molecular weight of 2000 to 4000 daltons.

5. The polyurethane sealant composition of claim 4, wherein the polybutylene glycol is poly(1,2 butylene glycol).

6. The polyurethane sealant composition of claim 1, wherein the cross-linker is polypropylene oxide triol having a number average molecular weight of 1000 to 3000 or N,N,N',N' tetrakis(2-hydroxypropyl) ethylenediamine.

7. The polyurethane sealant composition of claim 1, wherein the ratio of isocyanate to hydroxyl in the total composition is 1.2:1 to 1.3:1.

8. The polyurethane sealant composition of claim 1, wherein the component B further comprises a modified methylene-bis-(4-phenyl isocyanate) containing carbodiimide groups.

9. The polyurethane sealant composition of claim 1, wherein component A further comprises a reaction product of gamma-aminopropyltriethoxysilane with 2-cyanoethyl acrylate or the reaction product of gamma-aminopropyltriethoxysilane with benzyl methacrylate or a mixture of the reaction products.

10. The polyurethane sealant composition of claim 9, wherein the ratio of isocyanate to hydroxyl in the total composition is 1.2:1 to 1.3:1.

11. The polyurethane sealant composition of claim 1, wherein component A further comprises calcium oxide in an amount from 1.0 to 5.0 wt % of the total weight of the composition.

12. The polyurethane sealant composition of claim 1, further comprising a poly(dimethylsiloxane) having a number average molecular weight of 30 to 50 kilodaltons.

13. A polyurethane sealant composition comprising a component A and a component B, wherein
component A comprises
i) a hydrophobic polyether diol selected from the group consisting of polybutylene glycol, polytetramethylene ether glycol and a mixture thereof, having a number average molecular weight of 2000 to 4000 daltons that is present in an amount of 20 to 60 wt % of component A,
ii) a cross-linker selected from the group consisting of polypropylene oxide triol having a number average molecular weight of 1000 to 3000, N,N,N',N' tetrakis (2-hydroxypropyl)ethylenediamine and a mixture of polypropylene oxide triol having a number average molecular weight of 1000 to 3000 and N,N,N',N' tetrakis(2-hydroxypropyl)ethylenediamine, and
an antioxidant of the formula I:

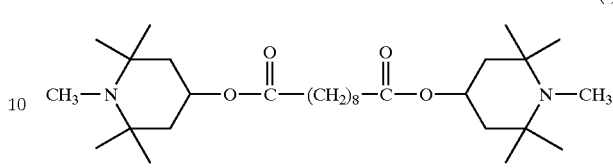

and component B comprises a polyisocyanate curing agent.

14. The polyurethane sealant composition of claim 13, wherein the polyether diol is polybutylene glycol having a number average molecular weight of 2000 to 4000 daltons.

15. The polyurethane sealant composition of claim 13, wherein the polybutylene glycol is poly(1,2 butylene glycol).

16. The polyurethane sealant composition of claim 13, wherein the polyether diol is polybutylene glycol having a number average molecular weight of 2000 to 4000 daltons or a mixture of polybutylene glycol having a number average molecular weight of 2000 to 4000 daltons and polytetramethylene oxide glycol having a number average molecular weight of 2000 to 4000 daltons.

17. The polyurethane sealant composition of claim 13, wherein the ratio of isocyanate to hydroxyl in the total composition is 1.2:1 to 1.3:1.

18. A polyurethane sealant composition comprising a component A and a component B, wherein
component A comprises
i) a hydrophobic polyether diol selected from the group consisting of polybutylene glycol, polytetramethylene ether glycol and a mixture thereof, having a number average molecular weight of 2000 to 4000 daltons that is present in an amount of 20 to 60 wt % of component A,
ii) a cross-linker selected from the group consisting of polypropylene oxide triol having a number average molecular weight of 1000 to 3000, N,N,N',N' tetrakis (2-hydroxypropyl)ethylenediamine and a mixture of polypropylene oxide triol having a number average molecular weight of 1000 to 3000 and N,N,N',N' tetrakis(2-hydroxypropyl)ethylenediamine, and
iii) an antioxidant;
and component B comprises a polyisocyanate curing agent, wherein the antioxidant comprises a compound of the formula I:

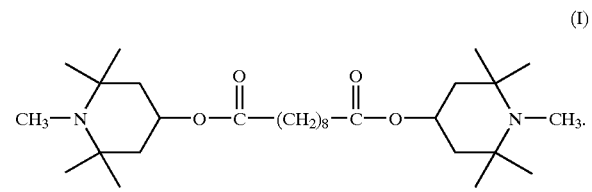

19. A method for sealing a porous substrate comprising coating the composition of claim 1 upon said substrate.

20. A method for sealing a joint between two surfaces comprising applying the composition of claim 1 to said joint.

* * * * *